United States Patent
Lin et al.

(10) Patent No.: US 10,917,600 B2
(45) Date of Patent: Feb. 9, 2021

(54) CURRENT DRIVEN PIXEL CIRCUIT AND RELATED IMAGE SENSOR

(71) Applicants: Egis Technology Inc., Taipei (TW); Igistec Co., Ltd., Hsinchu County (TW)

(72) Inventors: Yu Hsuan Lin, Hsinchu County (TW); Chung Yi Wang, Hsinchu County (TW)

(73) Assignees: Egis Technology Inc., Taipei (TW); Igistec Co., Ltd., Hsinchu (TW)

( * ) Notice: Subject to any disclaimer, the term of this patent is extended or adjusted under 35 U.S.C. 154(b) by 0 days.

(21) Appl. No.: 16/551,747

(22) Filed: Aug. 27, 2019

(65) Prior Publication Data

US 2020/0154070 A1 May 14, 2020

Related U.S. Application Data

(60) Provisional application No. 62/757,171, filed on Nov. 8, 2018.

(30) Foreign Application Priority Data

Jul. 25, 2019 (CN) .......................... 2019 1 0677601

(51) Int. Cl.
*H04N 5/378* (2011.01)
*H04N 5/369* (2011.01)
*H04N 5/3745* (2011.01)

(52) U.S. Cl.
CPC ........... *H04N 5/378* (2013.01); *H04N 5/3696* (2013.01); *H04N 5/3745* (2013.01)

(58) Field of Classification Search
CPC .... H04N 5/378; H04N 5/3696; H04N 5/3745; H04N 5/374; H04N 5/3698; H04N 5/335; H04N 5/2253
See application file for complete search history.

(56) References Cited

U.S. PATENT DOCUMENTS

| | | | |
|---|---|---|---|
| 6,982,406 B2* | 1/2006 | Chen | G01J 1/44 250/208.1 |
| 2014/0118584 A1* | 5/2014 | Lee | H04N 5/2254 348/262 |
| 2016/0117020 A1* | 4/2016 | Takemura | G06F 3/044 345/174 |
| 2017/0005219 A1* | 1/2017 | Goushcha | H01L 31/0203 |
| 2019/0383665 A1* | 12/2019 | Kaufman | G01J 5/0803 |

* cited by examiner

*Primary Examiner* — Timothy J Henn
(74) *Attorney, Agent, or Firm* — Winston Hsu

(57) ABSTRACT

A current-driven pixel circuit and a related image sensor are disclosed. The image sensor includes a pixel circuit array and a current reference circuit. The pixel circuit array includes a plurality of pixel circuits, each having a photo detecting element and a power element. The photo detecting element changes impendence in response to illumination. The power element is arranged to selectively provide a driving current to the photo detecting element. The current reference circuit includes a current source, wherein the power element provides the driving current according to a reference current of the current source, respectively.

9 Claims, 5 Drawing Sheets

CURRENT DRIVEN PIXEL CIRCUIT AND RELATED IMAGE SENSOR

CROSS REFERENCE TO RELATED APPLICATIONS

This application claims the benefit of U.S. Provisional Application No. 62/757,171, filed on Nov. 8, 2018. This application also claims the benefit of Chinese Patent Application No. 201910677601.9, filed on Jul. 25, 2019. The entire contents of the related applications are incorporated herein by reference.

BACKGROUND OF THE INVENTION

1. Field of the Invention

The present invention relates to optical sensing, and more particularly to a pixel circuit including a current-driven photo detecting element and related image sensor.

2. Description of the Prior Art

Image sensors are semiconductor devices that capture light and convert it to electrical signals, thereby to generate images and videos, which are widely used in a variety of applications. Typically, an image sensor generates images and video via information captured by an array including a plurality of pixel circuits. A structure of a conventional pixel circuit is illustrated in FIG. 1. As illustrated by FIG. 1, a pixel circuit 10 includes a photo detecting element 20, a switching element SW1 (reset switch), a switching element SW2 (readout switch), and parasitic capacitance $C_{PD}$. Operations of the pixel circuit 10 can be divided into three stages: a reset stage, a sensed stage and a readout stage. In the reset stage, the switching element SW1 is turned on, and supply voltage is applied to the photo detecting element 20, such that voltage level at a terminal of the parasitic capacitance $C_{PD}$ is charged to be identical to the supply voltage. In the sense stage, the switching element SW1 is turned off and the parasitic capacitance $C_{PD}$ is discharged to ground potential via the photo detecting element 20. Accordingly, the photo detecting element 20 starts to be exposed. After exposed, the readout stage is entered, where the switching element SW2 is turned on. An external readout circuit reads sensed signal $V_{sensed}$ from terminal of the photo detecting element 20.

However, under such structure, the sensed signal $V_{sensed}$ is in direct proportion to an exponential function of a product of an impedance of the photo detecting element 20 (e.g. the resistance of the photoresistor $R_0$) and a capacitance of the parasitic capacitance $C_{PD}$. This leads to the fact that the relationship between the sensed signals $V_{sensed}$ and the illumination change (i.e., changing of impedance of the photoresistor $R_0$) is non-linear. Therefore, the pixel circuit 10 is sensitive to illumination only in a certain range of intensity of illumination. On the other hand, such structure relies on a supply voltage to charge the parasitic capacitance $C_{PD}$ to drive the pixel circuit 10. When performing photo detecting, the parasitic capacitance $C_{PD}$ has to be discharged to the ground potential via the photo detecting element 20, so as to reflect the changing of illumination. That is, a certain period of time is required to charge and discharge the parasitic capacitance $C_{PD}$ in order to precisely determine the changing of illumination. This also limits a response time of the pixel circuit 10.

To address the above-mentioned problems, the present invention provides an innovative pixel circuit.

SUMMARY OF THE INVENTION

Therefore, it is one object of the present invention to provide an innovation pixel circuit structure and related image sensor. The present invention employs a current-driving manner to drive photo detecting elements in pixel circuits by introducing current mirrors in the image sensor. Different from driving photo detecting elements with reset switches in the conventional art, there could be a linear relationship between sensed signals of pixel circuits and impedances of photo detecting elements in the present invention, which allows the image sensor sensitivity to the full range of the intensity of illumination. Therefore, the image sensor of the present invention is more sensitive and has a better performance compared to the image sensor of the conventional art.

According to one embodiment of the present invention, an image sensor is provided. The image sensor comprises: a pixel circuit array and a current reference circuit. The pixel circuit array includes a plurality of pixel circuits, each of which includes: a photo detecting element and a power element. The photo detecting element varies its impedance in response to illumination. The power element is arranged to selectively provide a driving current to the photo detecting element. The current reference circuit comprises a current source, wherein the power element respectively provides the driving current according a reference current of the current source.

According to one embodiment of the present invention, a pixel circuit is provided. The pixel circuit comprises: a photo detecting element and a power element. The photo detecting element varies its impedance in response to illumination. The power element is arranged to selectively provide a driving current to the photo detecting element. The power element is arranged to assist an external current reference circuit to form a current mirror. The power element generates the driving current according to a reference current of a current source in the current reference circuit.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
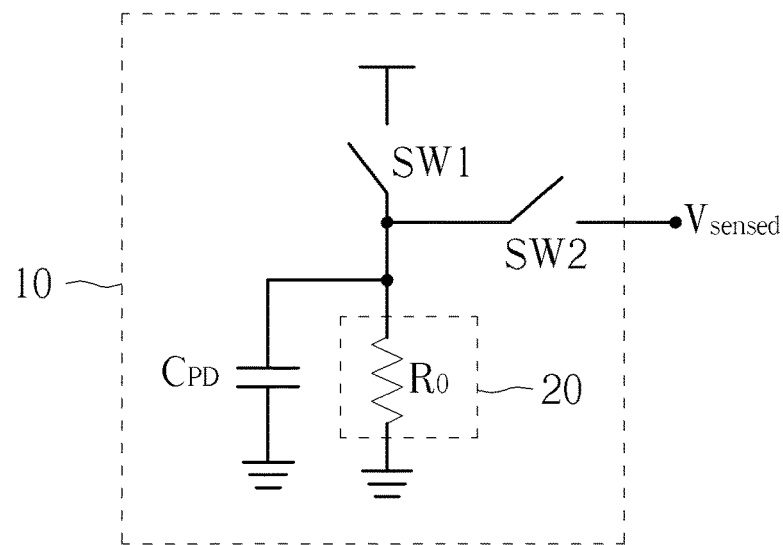
FIG. 1 is a diagram illustrating a structure of a conventional pixel circuit.

Certain terms are used throughout the following descriptions and claims to refer to particular system components. As one skilled in the art will appreciate, manufacturers may refer to a component by different names. This document does not intend to distinguish between components that differ in name but not differ in functionality. In the following discussion and in the claims, the terms "include", "including", "comprise", and "comprising" are used in an open-ended fashion, and thus should be interpreted to mean "including, but not limited to . . . " The terms "couple" and "coupled" are intended to mean either an indirect or a direct electrical connection. Thus, if a first device couples to a second device, that connection may be through a direct electrical connection, or through an indirect electrical connection via other devices and connections.

Different features of the present invention are detailed as below in reference to the figures, and for convenience of explanation, the same elements in separate figures are indicated by the same reference numerals. Moreover, reference throughout this specification to "one embodiment" means that a particular feature, structure or characteristic described in connection with the embodiment or example is included in at least one embodiment of the present embodiments. Thus, appearances of the phrases "in one embodiment", in various places throughout this specification are not necessarily all referring to the same embodiment or example. Furthermore, the particular features, structures or characteristics may be combined in any suitable combinations and/or sub-combinations in one or more embodiments or examples.

Figure 2:
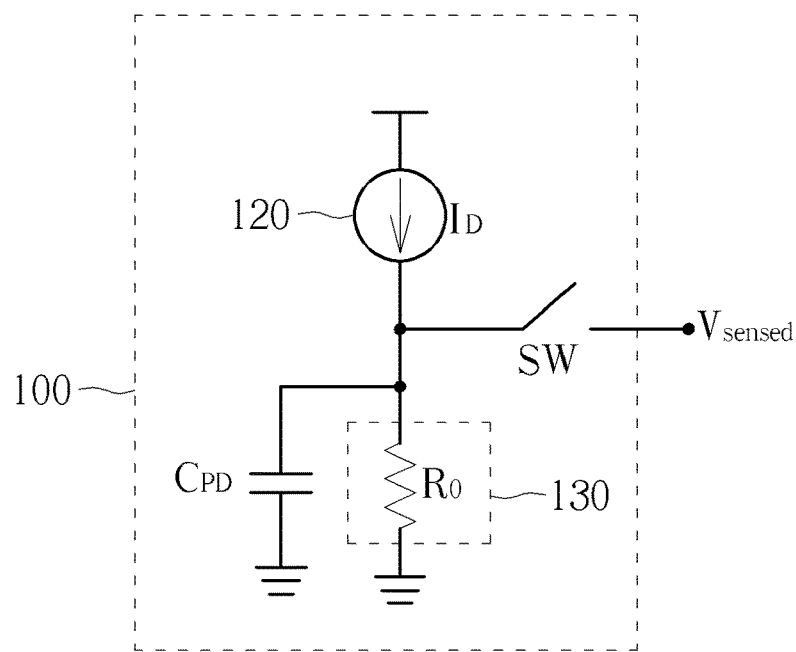
FIG. 2 is a diagram illustrating a structure of a pixel circuit according to one embodiment of the present invention.

FIG. 2 is a diagram illustrating a pixel circuit according to one embodiment of the present invention. As shown by FIG. 2, a pixel circuit 100 comprises power element 120, a photo detecting element 130, a switching element SW (readout switch) and a parasitic capacitance $C_{PD}$. The photo detecting element 130 is sensitive to illumination. An impedance of the photo detecting element 130 varies with intensity of illumination. In one embodiment, the photo detecting element 130 could be a photoresistor $R_0$. However, this is not a limitation of the present invention. According to various embodiments of the present invention, the photo detecting element 130 can be any element that is sensitive to illumination and varies its impedance according to changing of illumination, such as a photodiode. When the power element 120 provides the driving current $I_D$ to the photo detecting element 130 and the switching element SW is turned on, the pixel circuit 100 can output a sensed signal $V_{sensed}$ that is identical to a product of the instant impedance Z of the photo detecting element 130 and the magnitude of the driving current $I_D$, i.e., $V_{sensed}=I_D*Z$.

Figure 3:
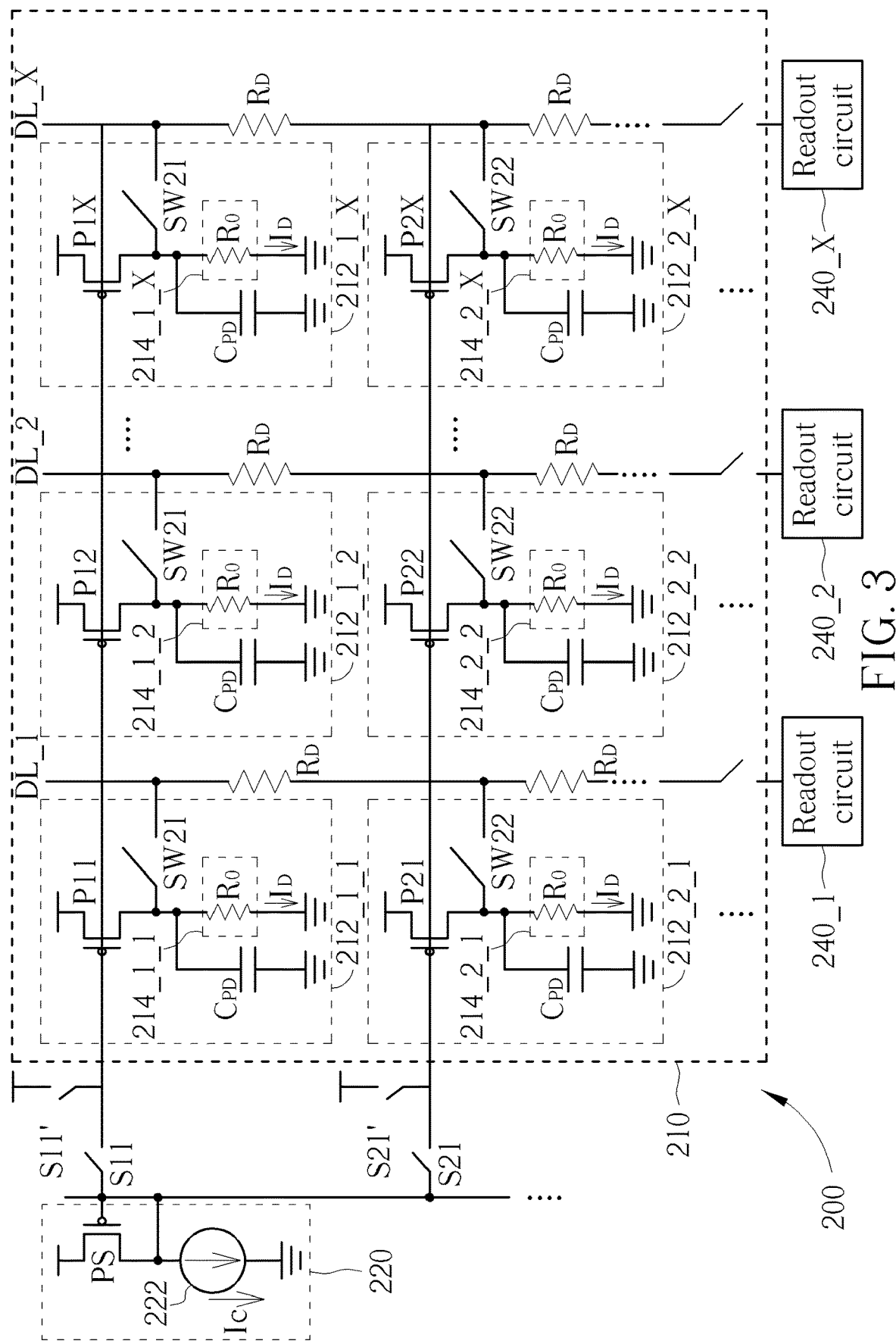
FIG. 3 is a diagram illustrating an image sensor that is implemented based on the pixel circuits of FIG. 2 according to a first embodiment of the present invention.

FIG. 3 illustrates an image sensor that is implemented based on the pixel circuits of FIG. 2 according to one embodiment of the present invention. As shown by FIG. 3, an image sensor 200 comprises a pixel circuit array 210 having X*Y pixel circuits 212_1_1-212_Y_X (where X is 3, Y is 2 in this embodiment), a current reference circuit 220, switching elements S11-SY1 and S11'-SY1', and readout circuits 240_1-240_X. In one embodiment, each of the pixel circuits 212_1_1-212_Y_X comprises a photo detecting element 214_1_1-214_Y_X (e.g. photoresistor $R_0$), a switching element SW21-SW2Y, and a power element (i.e., transistor P11-PYX).

The pixel circuits 212_1_1-212_Y_X are mainly driven by a shared current source 222 of the current reference circuit 220. The current reference circuit 220 further comprises a transistor PS. In a pre-charge stage, any of the switching elements S11-SY1 is turned on, which allows the current reference circuit 220 coupled to a corresponding row of pixel circuits of the pixel circuit array 210. In one embodiment, for example, when the switching element S11 is turned on, the current reference circuit 220 is therefore coupled to a first row of pixel circuits 212_1_1-212_1_X. At this time, the transistor PS of the current reference circuit 220 and the power element (i.e., transistors P11-P1X) of each of the pixel circuits 212_1_1-212_1_X form current mirror structure, respectively. According to a reference current $I_C$ of the shared current source 222, each of transistors P11-P1X generates the driving current $I_D$, and provides the driving current $I_D$ to each of the photo detecting elements 214_1_1-214_1_X of the pixel circuits 212_1_1-212_1_X, respectively. Based on a ratio of dimensions of the transistor PS to dimensions of transistors P11-P1X, there could be a same ratio of the magnitude of the reference current $I_C$ to the magnitude of the driving current $I_D$. In one embodiment, the reference current $I_C$ is identical to the driving current $I_D$ in their intensities.

In a following sense stage, voltages across terminals of the photo detecting element 214_1_1-214_1_X increase, where each of the voltages across the terminals of the photo detecting element 214_1_1-214_1_X is identical to a product of the magnitude of the driving current $I_D$ and the impedance Z of a corresponding photo detecting element. Subsequently, in a readout stage, the switching elements SW21 in the pixel circuits 212_1_1-212_1_X are turned on, which allow the pixel circuits 212_1_1-212_1_X to respectively couple to a corresponding column line DL_1-DL_X. Each of column lines DL_1-DL_X are respectively coupled to a corresponding readout circuit 240_1-240_X. When the pixel circuits 212_1_1-212_1_X are respectively coupled to the corresponding column line DL_1-DL_X, the readout circuits 240_1-240_X could read sensed signals out by detecting the voltages across the terminals of the pixel circuit 212_1_1-212_1_X via the column lines DL_1-DL_X.

After sense and readout operations of the row of the pixel circuits 212_1_1-212_1_X are done, the switching element S11 will be turned off and the switching element S11' will be turned on, such that the transistors P11-P1X of the pixel circuits 212_1_1-212_1_X are cut off, stopping providing the driving current $I_D$ to the photo detecting elements 214_1_1-214_1_X. At this time, the image sensor 200 proceeds on the pre-charge, sense and readout operations for next row of the pixel circuits. The switching element S21 will be turned on, such that the transistor PS of the current reference circuit 220 and each of the transistors P21-P2X of the pixel circuits 212_2_1-212_2_X forms a current mirror structure, respectively. Accordingly, the transistors P21-P2X start to provide the driving current $I_D$ to the photo detecting elements 214_2_1-214_2_X, thereby to carry on the pre-charge, sense and readout operations of the pixel circuits 212_2_1-212_2_X. Once the sense and readout operations on the pixel circuits 212_2_1-212_2_X are done, the switching element S21 will be turned off and the switching element S21' will be turned on, thereby to proceed on the pre-charge, sense and readout operations for next row of pixel circuits of the pixel circuit array 210.

Even though timings of the pre-charge, sense and readout operations of one row of pixel circuits are not overlapped with those of another row of pixel circuits, the timings of these operations, however, may be overlapped with each other due to certain requirements. For example, when performing sense and readout operations of the first row of pixel circuits 212_1_1-212_1_X, the switching element S21 may be turned on, thereby to perform the pre-charging operation of the second row of pixel circuits 212_2_1-212_2_X earlier. In other words, the switching elements S11 and S21 may both turn on during a certain period. Similarly, other switching elements that are not shown may be operated in a same manner. However, as pixel circuits of different rows share same readout circuits 240_1-240_X, the switching elements SW21-SW2Y will not be turned on at the same time.

In one embodiment, a magnitude of the reference current $I_C$ may vary in different operation stages. For example, in the pre-charge stage, the reference current $I_C$ can be larger than it is in other stages. That is, the driving current $I_D$ can be larger if necessary, thereby to pre-charge the parasitic capacitance $C_{PD}$ to higher potential more quickly, such that the period of the sense stage and the period of readout stage can be shortened.

Figure 4:
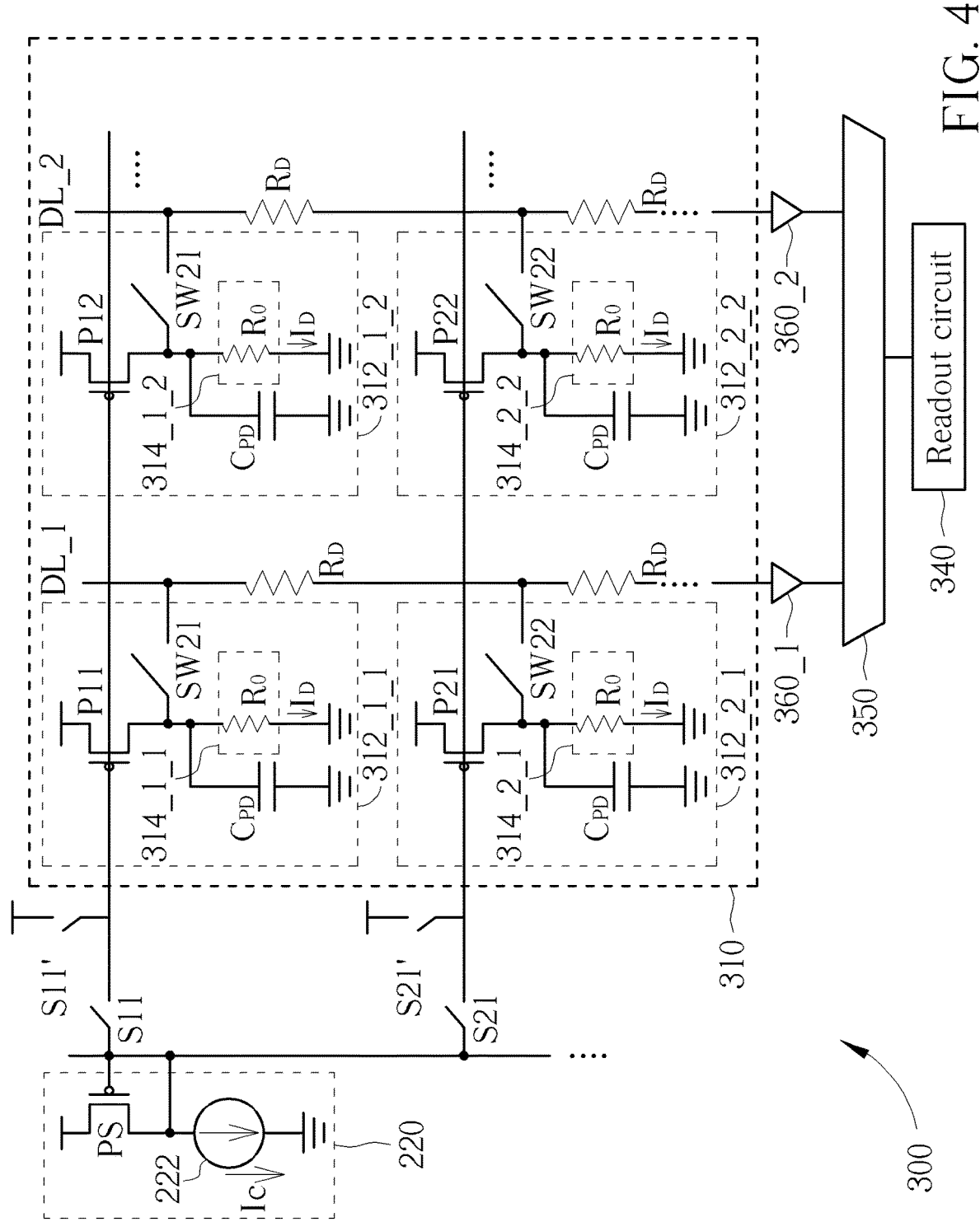
FIG. 4 is a diagram illustrating an image sensor according to a second embodiment of the present invention.

FIG. 4 illustrates an image sensor 300 according to a second embodiment of the present invention. In this embodiment, (where X is 2, Y is 2), sensed signals of pixel circuits 312_1_1-312_Y_X of a pixel circuit array 310 is read by a shared readout circuit 340. By the control of a multiplexer 350, voltages across terminals of photo detecting element 314_1_1-314_Y_X of the pixel circuits 312_1_1-312_Y_X are sequentially read.

The pixel circuits 312_1_1-312_1_X of the pixel circuit array 310 are controlled by the switching elements SW21-SW2Y to couple to corresponding column lines DL_1-DL_X at proper timings. Each of column lines DL_1-DL_X is respectively coupled to a corresponding buffer 360_1-360_X. In the readout stage, the buffers 360_1-360_X deliver sensed signals of the pixel circuits 312_1_1-312_1_X from the column lines DL_1-DL_X to the multiplexer 350. The multiplexer 350 sequentially delivers the sensed signals of the pixel circuits 312_1_1-312_1_X to the readout circuit 340 for the readout operation.

Figure 5:
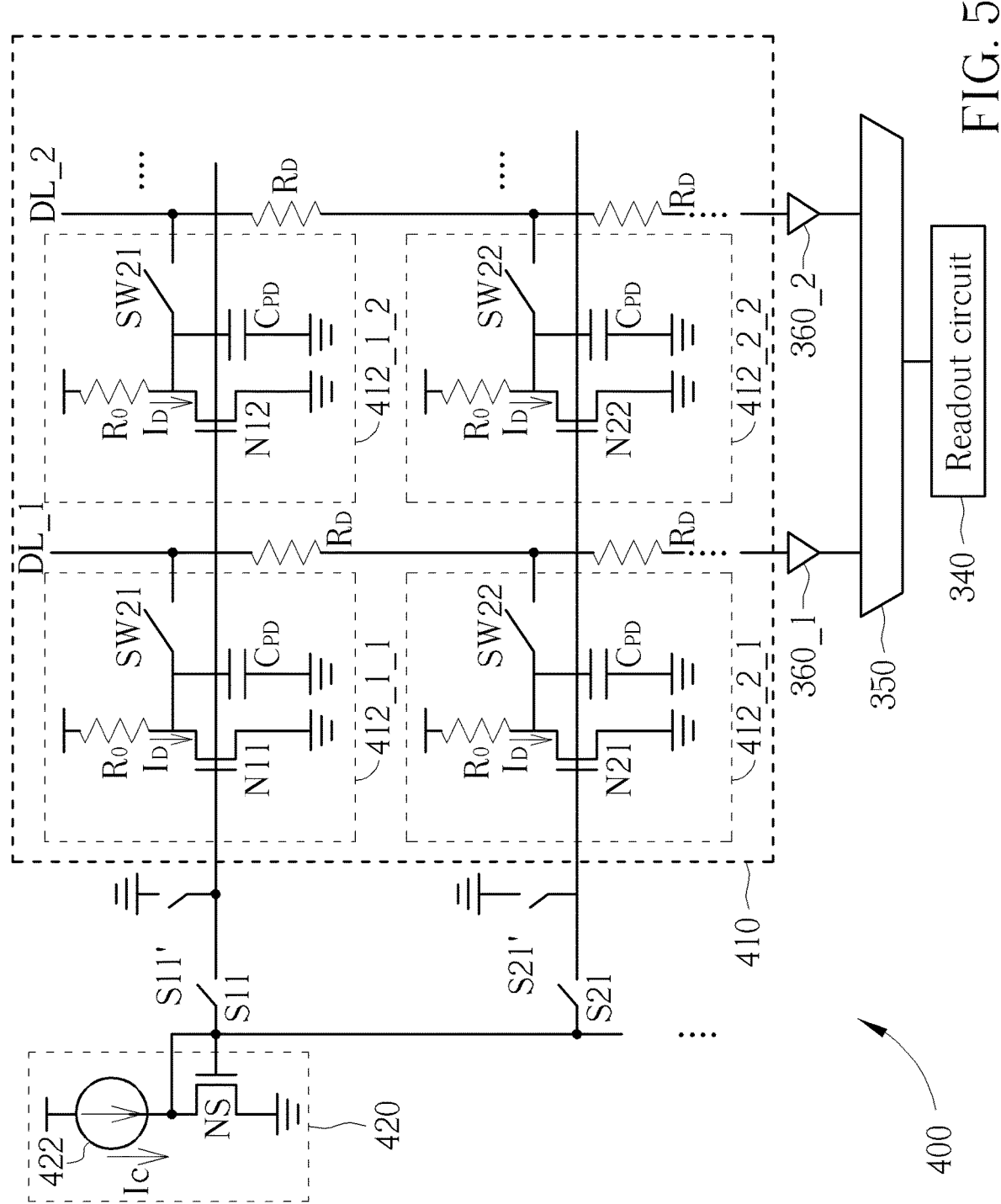
FIG. 5 is a diagram illustrating an image sensor according to a third embodiment of the present invention.

According to a third embodiment of the present invention, FIG. 5 illustrates an image sensor 400 that is an alternative version of the embodiment of FIG. 3. A difference between this embodiment and the embodiment of FIG. 3 is the conductive type of the transistors for providing the driving current in the current mirror structure. In the image sensor 400 of this embodiment (where X is 2, Y is 2), a current source 422 of a current reference circuit 420 is coupled to an N-type transistor NS. With the control of the switching elements S11-SY1, the current reference circuit 420 is selectively coupled to different rows of pixel circuits 412_1_1-412_Y_X in a pixel circuit array 410, such that the current reference circuit 420 and each of N-type transistors N11-NYX in the pixel circuits 412_1_1-412_Y_X form the current mirror structure, respectively.

Figure 6:
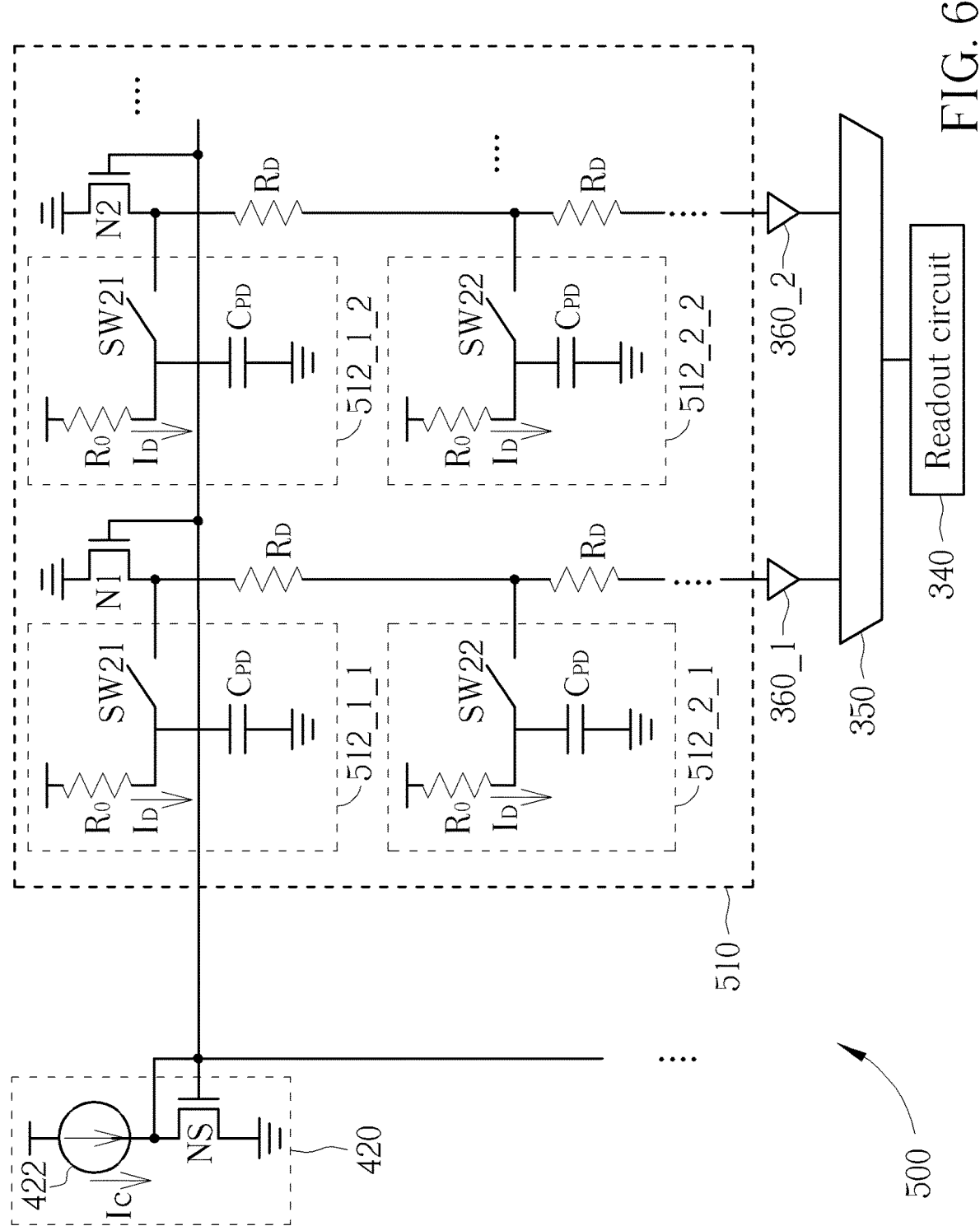
FIG. 6 is a diagram illustrating an image sensor according to a fourth embodiment of the present invention.

An image sensor 500 according to a third embodiment of the present invention is illustrated in FIG. 6. In this embodiment, a size of one pixel circuit of the image sensor 500 is further reduced. In this embodiment (where X=2, Y=2), transistors in the above-mentioned embodiments are replaced by switching elements SW21-SW2Y, as power elements of the pixel circuits 512_1_1-512_Y_X of the pixel circuit array 510. The current reference circuit 420 forms current mirror structure by being coupled to transistors N1-NX at each column.

At first, the current reference circuit 420 is coupled to transistors N1-NX at each column, the current reference circuit 450 and each of transistors N1-NX respectively forms current mirror structure. Accordingly, each of the transistors N1-NX generates the driving current $I_D$. Once the switching element SW21 is turned on, a first row of pixel circuits 512_1_1-512_1_X derive the driving current $I_D$ from the transistors N1-NX, respectively, thereby to drive the photoresistors $R_0$. After a certain period of time of pre-charging and properly exposing the photoresistor $R_0$, voltages across terminals of the pixel circuits 512_1_1-512_1_X are readout by the readout circuit 340 as sensed signals. After sensed signals of the first row of pixel circuits 512_1_1-512_1_X have been read, the switching element SW21 will be turned off. Then, the switching element SW22 will be turned on. A second row of pixel circuits 512_2_1-512_2_X derives the driving current $I_D$ from the transistors N1-NX, thereby to drive the photoresistors $R_0$ thereof, which leads to the pre-charge, sense and readout operations. In this embodiment, as the number of transistors used in the pixel circuits 512_1_1-512_Y_X is reduced, circuit size of a single pixel circuit is significantly reduced. As a result, overall circuit size of the image sensor 500 is also reduced.

In conclusion, since the photo detecting elements in the pixel circuits of the present invention are driven by current, the relationship between the sensed signal and the impedance of the photo detecting element could be linear, such that the pixel circuit array is sensitive to illumination in the entire range of intensity of illumination. In contrast to this, as the conventional pixel circuits that relies upon reset switches to drive the photo detecting element in a voltage-driving manner, the relationship between the sensed signal and the impedance of the photo detecting element is non-linear. Therefore, the pixel circuit array is not sensitive to the illumination in the entire range of the intensity of illumination. On the other hand, since the present invention employs currents to drive the photo detecting elements, the magnitude of the driving currents can be directly adjusted by changing the magnitude of the reference current of the current reference circuit. Therefore, the charge time of the present invention is controllable and shorter. In contrast to this, as the conventional pixel circuit is driven by supply voltage, response time of the conventional pixel circuit is limited by charge and discharge time of the parasitic capacitance $C_{PD}$. The conventional pixel circuit has less direct and slower response to illumination than the current-driven pixel circuit of the present invention. In view of this, the image sensor of the present invention is more sensitive and has a better performance compared to the image sensor of the conventional art.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:
1. An image sensor, comprising:
 a pixel circuit array including a plurality of pixel circuits, each comprising:
  a photo detecting circuit, arranged to change impendence in response to illumination; and
  a power circuit, arranged to selectively provide a driving current to the photo detecting circuit; and
  a current reference circuit including a current source, wherein the power circuit provides the driving current according to a reference current of the current source, respectively.
2. The image sensor of claim 1, further comprising:
 a plurality of first switching circuits, each of which arranged to couple the current reference circuit to a corresponding row of the pixel circuits;
 wherein when one or more of the first switching circuits couples the current reference circuit to one or more rows of the pixel circuits, the current reference circuit and the power circuit in the one or more rows of the pixel circuits form a current mirror respectively, thereby to provide the driving current to a corresponding photo detecting circuit according to the reference current.

3. The image sensor of claim 2, wherein the power circuit is a transistor.

4. The image sensor of claim 1, further comprising:
a plurality of second switching circuits, each of which arranged to couple a reference voltage to a corresponding row of the pixel circuits;
wherein when one or more of the second switching circuits couples the reference voltage to one or more rows of the pixel circuits, the power circuit in each pixel circuit of the one or more rows of the pixel circuits is turned off, thereby to stop providing the driving current to the photo detecting circuit in each pixel circuit of the one or more rows of the pixel circuits.

5. The image sensor of claim 1, further comprising:
a plurality of transistors respectively corresponding to a plurality of columns of the pixel circuit array and coupled to the pixel circuits;
wherein each of the transistors and the current reference circuit form a current mirror respectively, and each power circuit is a switching circuit; when the switching circuit couples the photo detecting circuit to the corresponding transistor, the switching circuit derives the driving current from the transistor, thereby to provide the driving current to the photo detecting circuit.

6. The image sensor of claim 1, further comprising:
at least one readout circuit, arranged to read signals from the image sensor.

7. The image sensor of claim 6, further comprising:
a buffer device including a plurality of buffer circuits respectively coupled to a plurality column lines of the pixel circuit array, arranged to output a plurality of output signals; and
a multiplexer, coupled to the readout circuit and the buffer device, arranged to output one of the output signals to the readout circuit.

8. The image sensor of claim 1, wherein a magnitude of the reference current varies in different operation stages.

9. A pixel circuit, comprising:
a photo detecting circuit, arranged to change an impendence of the photo detecting circuit in response to illumination; and
a power circuit arranged to selectively provide a driving current to the photo detecting circuit;
wherein the power circuit is arranged to assist an external current reference circuit to form a current mirror, and wherein, the power circuit provides the driving current according to a reference current of a current source in the current reference circuit.

* * * * *